United States Patent
Park et al.

(10) Patent No.: US 9,731,761 B1
(45) Date of Patent: Aug. 15, 2017

(54) STEERING-WHEEL CONTROL

(71) Applicant: Ford Global Technologies, LLC, Dearborn, MI (US)

(72) Inventors: Joseph Park, Saint Clarie Shores, MI (US); Oliver Nehls, Düsseldorf/Nordrhein-Westfalen (DE); Jan Bremkens, Straelen/NRW (DE); Lodewijk Wijffels, Canton, MI (US); Sergio Codonesu, Heerlen (NL)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/175,157

(22) Filed: Jun. 7, 2016

(51) Int. Cl.
*B62D 15/02* (2006.01)
*G05D 1/00* (2006.01)

(52) U.S. Cl.
CPC ....... *B62D 15/025* (2013.01); *B62D 15/0285* (2013.01); *G05D 1/0088* (2013.01)

(58) Field of Classification Search
CPC . B62D 15/025; B62D 15/0285; G05D 1/0088
See application file for complete search history.

(56) References Cited

U.S. PATENT DOCUMENTS

| | | | |
|---|---|---|---|
| 6,408,234 B1 | 6/2002 | Wittig | |
| 7,469,176 B2* | 12/2008 | Turner | B62D 5/008 701/1 |
| 8,515,622 B2 | 8/2013 | Shah et al. | |
| 2004/0011586 A1* | 1/2004 | Zhao | B62D 5/006 180/402 |
| 2012/0029769 A1* | 2/2012 | Chen | B60W 10/184 701/38 |
| 2012/0059547 A1* | 3/2012 | Chen | B60W 10/04 701/37 |
| 2012/0101660 A1* | 4/2012 | Hattori | G05D 1/0022 701/2 |
| 2012/0283912 A1 | 11/2012 | Lee et al. | |
| 2015/0081156 A1* | 3/2015 | Trepagnier | G01S 17/023 701/26 |
| 2015/0158524 A1* | 6/2015 | Lee | B62D 15/025 701/41 |
| 2015/0158528 A1* | 6/2015 | Moshchuk | B62D 15/0265 701/41 |
| 2015/0259007 A1* | 9/2015 | Di Cairano | B62D 15/025 701/41 |

(Continued)

FOREIGN PATENT DOCUMENTS

| | | |
|---|---|---|
| DE | 102004039142 A1 | 2/2006 |
| DE | 102010028140 A1 | 3/2013 |
| WO | WO 2016023756 A1 | 2/2016 |

*Primary Examiner* — Rodney Butler
(74) *Attorney, Agent, or Firm* — Frank A. MacKenzie; Bejin Bieneman PLC (57) ABSTRACT

A vehicle includes a steering wheel and at least one road wheel. The steering wheel is rotatably connected to a steering-wheel actuator, and the at least one road wheel is movably connected to a steering system. A controller is in communication with the steering system and the steering-wheel actuator. The controller is programmed to determine a steering-wheel angle based on a road-wheel angle, an operation mode, and a steering-compensation type; and to instruct the steering-wheel actuator to rotate the steering wheel according to the steering-wheel angle.

18 Claims, 7 Drawing Sheets

(56) References Cited

U.S. PATENT DOCUMENTS

2016/0075369 A1* 3/2016 Lavoie ............... B62D 15/0285
                                                180/446
2016/0229450 A1* 8/2016 Basting ................. B62D 5/008
2016/0288831 A1* 10/2016 Lee ......................... B62D 6/00

* cited by examiner

STEERING-WHEEL CONTROL

BACKGROUND

Autonomous vehicles have the ability to operate without the intervention of a human operator, e.g., driver, that is, a vehicle computer makes decisions about accelerating, braking, and steering the vehicle. A vehicle may be fully autonomous or semi-autonomous. A semi-autonomous vehicle may be autonomous only in particular situations, for example, highway driving or parallel parking, or with respect to certain vehicle subsystems, for example, braking but not acceleration or steering.

When a vehicle is driving autonomously, a vehicle computer, sometimes referred to as a "virtual operator" or "virtual driver," may send signals directly to the engine, brakes, and steering; the signals need not pass through the controls accessible to the human operator, the pedals and steering wheel. A steering wheel that does not move while the vehicle moves, however, may disorient the human operator. On the other hand, a steering wheel that rotates dramatically with sharp turns taken by the vehicle may also disturb the human operator. Moreover, a handover may become more difficult if a steering wheel is not moved during autonomous operation of steering, and if the human operator does not know the orientation of the front wheels of the vehicle.

DETAILED DESCRIPTION

With reference to the Figures, wherein like numerals indicate like parts throughout the several views, a vehicle 30 includes a steering wheel 32 and at least one road wheel 34. The steering wheel 32 can be actuated according to an orientation of the road wheels 34 of the vehicle 30. Further, actuation of the steering wheel can be customized to a driving mode of the vehicle 30, e.g., autonomous versus semi-autonomous, and to human operator-specific settings. For example, in a fully autonomous operation mode, the steering wheel 32 may remain stationary so as not to distract the human operator. Alternatively, in an autonomous or semi-autonomous mode, the steering wheel 32 may rotate but less than the steering wheel 32 would for a given road-wheel angle ϕ when the vehicle 30 steering was under manual control, thus communicating to the human operator the direction of the road wheels 34 without rotating the steering wheel 32 through multiple turns. Providing a variety of possible types of steering compensation allow control of the steering wheel 32 to be optimized for a current operation mode and/or human operator.

Figure 1:
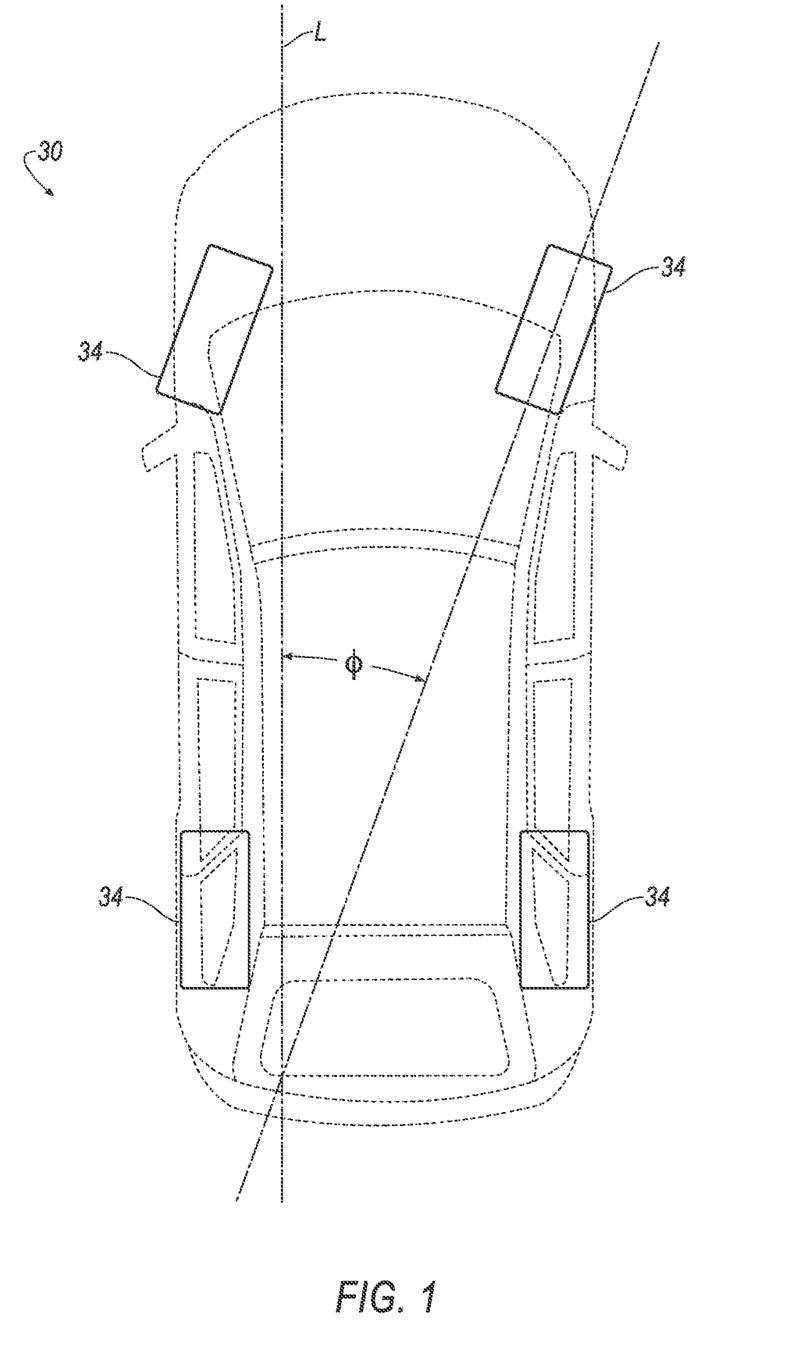
FIG. 1 is a top view of an example vehicle.
Figure 2:
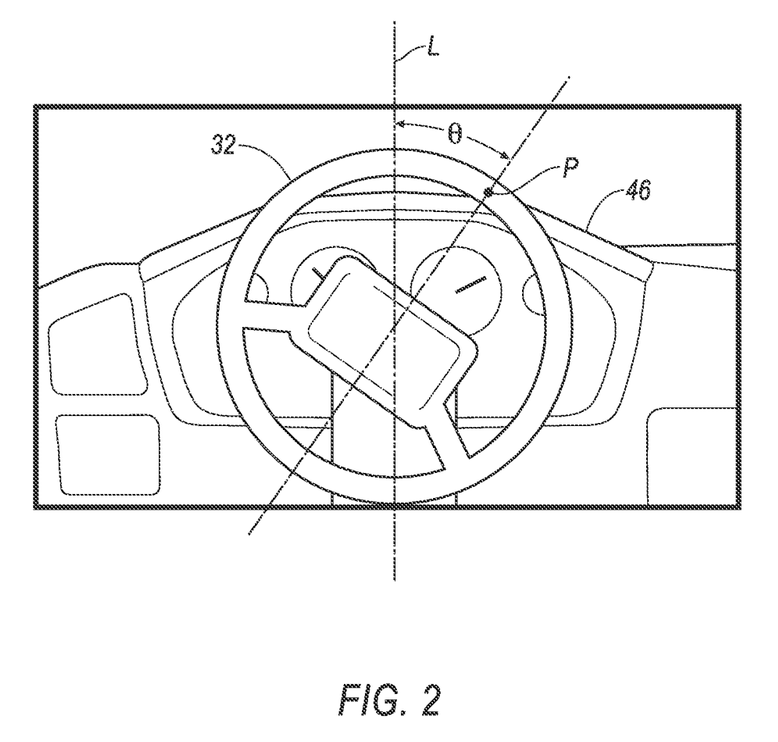
FIG. 2 is a rear view of a steering wheel and dashboard of the vehicle of FIG. 1.
Figure 3:
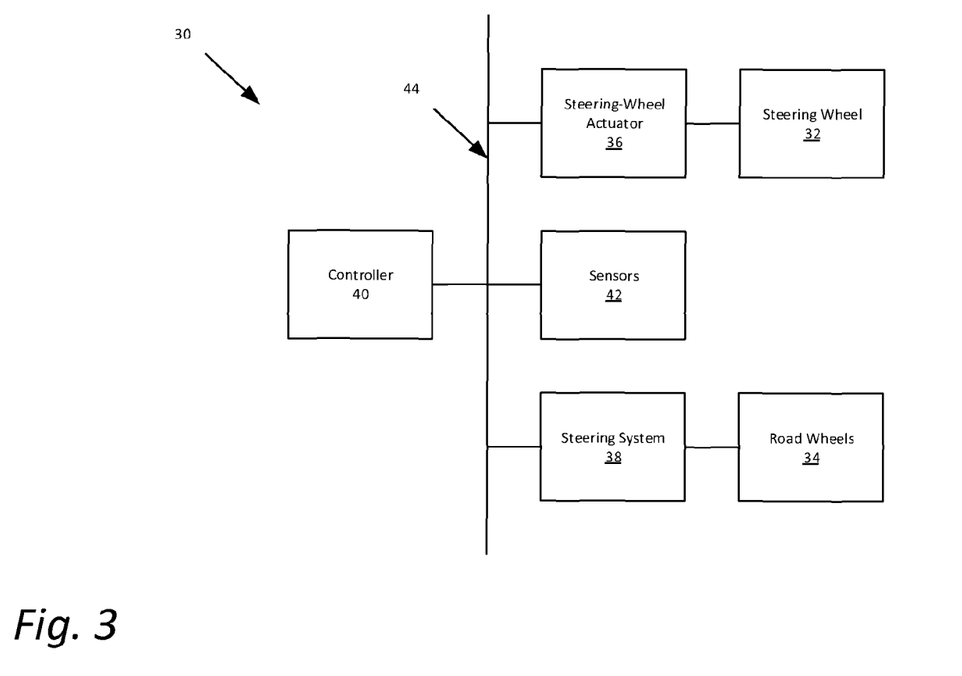
FIG. 3 is a block diagram of the vehicle of FIG. 1.

As shown in FIGS. 1-3, the steering wheel 32 is rotatably connected to a steering-wheel actuator 36, and the at least one road wheel 34 is movably connected to a steering system 38. A controller 40 is in communication with the steering system 38 and the steering-wheel actuator 36. The controller 40 is programmed to determine a steering-wheel angle θ based on a road-wheel angle ϕ, an operation mode, and a steering-compensation type. The controller 40 is further programmed to instruct the steering-wheel actuator 36 to rotate the steering wheel 32 according to the steering-wheel angle θ.

The steering-wheel angle θ is an angular orientation of the steering wheel 32 relative to a longitudinal plane L of the vehicle 30, e.g., the plane including a steering column to which the steering wheel 32 is affixed and running in the forward direction of travel of the vehicle 30. The road-wheel angle ϕ is an angle of the road wheel 34 relative to the forward direction of the vehicle 30 as defined by the longitudinal plane L.

An operation mode specifies an entity or entities that control(s) some or all operations of the vehicle 30, i.e., one of the controller 40, a human operator, or control by a combination of inputs from the controller 40 and a human operator. For example, operation modes could specify that a human operator and/or the controller 40 controls one or more respective systems of the vehicle 30, including propulsion, e.g., a powertrain including an engine; steering; and brakes, and the conditions under which that operation mode occurs. Possible operation modes include nonautonomous driving, fully autonomous driving, and semi-autonomous driving (i.e., some operations are controlled by the controller 40 and some operations are controlled by a human operator), semi-autonomous modes further possibly including automatic parking assist, collision avoidance, and others.

The steering-compensation type, as discussed further below, defines the relationship between the road-wheel angle ϕ, as determined by the steering system 38, typically in a known manner, and the steering-wheel angle θ.

As shown in FIGS. 1-3, the vehicle 30 includes the steering wheel 32 rotatably connected to the steering-wheel actuator 36 and a plurality of road wheels 34. The road wheels 34 or a subset thereof, e.g., front wheels 34, are connected to the steering system 38.

The vehicle 30 may be an autonomous vehicle. The controller 40, sometimes referred to as the "virtual operator" or "virtual driver," may be capable of operating the vehicle 30 independently of the intervention of a human operator, to a greater or a lesser degree. The controller 40 may be programmed to operate the propulsion, brakes, steering, and/or other vehicle systems.

The road wheels 34 support the vehicle 30 against a road or the ground and rotate to propel the vehicle 30 forward or backward. The road wheels 34 may be metal hubs with a rubber tube extending around the metal hubs, or any other suitable material or structure. A subset of the road wheels 34 are connected to the steering system 38 and turn relative to the longitudinal plane L of the vehicle 30. The road-wheel angle ϕ is an angle of the road wheel 34 relative to the longitudinal plane L running in the forward direction of the vehicle 30.

The steering system 38 controls the turning of the road wheels 34. The steering system 38 is in communication with and receives input from the steering wheel 32 and the controller 40. The steering system 38 may be a rack-andpinion system with electric power-assisted steering, a steer-by-wire system, as are both known in the art, or any other suitable system.

The steering wheel 32 is rotatably coupled to a dashboard 46 in a passenger cabin of the vehicle 30. The steering wheel 32 is graspable by an occupant and accepts input from the occupant. The steering wheel 32 may be circular in shape. The steering wheel 32 has a top point P, which is the uppermost point on the steering wheel 32 when the road-wheel angle $\phi$ is zero and steering compensation is not used. The steering wheel 32 has a steering-wheel angle $\theta$, that is, an angular orientation of the steering wheel 32 relative to the longitudinal plane L. The steering-wheel angle $\theta$ may be measured from a point on the periphery of the steering wheel 32, for example, the top point P, to the vertical axis. When the top point P is on the longitudinal plane L, the steering wheel 32 is at a center position, and the steering-wheel angle $\theta$ is zero.

The steering-wheel actuator 36 is rotatably connected to the steering wheel 32 and is provided to rotate the steering wheel 32. The steering-wheel actuator 36 may be, for example and as is known, an electric motor. The steering-wheel actuator 36 is in communication with and receives instructions from the controller 40. The steering-wheel actuator 36 may transfer input from the steering wheel 32 to the steering system 38, i.e., movement of the steering wheel to change the angle $\theta$ provides input to the steering system 38 to change the angle $\phi$, or the steering-wheel actuator 36 may move the steering wheel 32 independently of the steering system 38.

The vehicle 30 includes sensors 42, such as are known, in communication with the controller 40. The sensors 42 are provided to detect states of the vehicle 30, for example, wheel speed, wheel orientation, and engine and transmission values. The sensors 42 may detect the position or orientation of the vehicle 30; for example, the sensors 42 can include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may further detect the external world, for example, radar sensors, scanning laser range finders, light detection and ranging (LIDAR) devices, image processing sensors such as cameras. The sensors 42 may include communications devices, for example, vehicle-to-infrastructure (V2I) or vehicle-to-vehicle (V2V) devices.

The controller 40 is a computing device that generally includes a processor and a memory, the memory including one or more forms of computer-readable media, and storing instructions executable by the processor for performing various operations, including as disclosed herein. The memory of the controller 40 further generally stores remote data received via various communications mechanisms; e.g., the controller 40 is generally configured for communications on a controller area network (CAN) bus or the like, and/or for using other wired or wireless protocols, e.g., Bluetooth, etc. The controller 40 may also have a connection to an onboard diagnostics connector (OBD-II). Via a vehicle network using Ethernet, WiFi, the CAN bus, Local Interconnect Network (LIN), and/or other wired or wireless mechanisms, the controller 40 may transmit messages to various devices in the vehicle 30 and/or receive messages from the various devices, e.g., controllers, actuators, sensors, etc., e.g., controllers and sensors 42 as discussed herein. For example, the controller 40 may receive data from the sensors 42. Although one controller 40 is shown in FIG. 1 for ease of illustration, it is to be understood that the controller 40 could include, and various operations described herein could be carried out by, one or more computing devices.

The memory of the controller 40 may store, e.g., in a table or the like, a plurality of possible road-wheel angles $\phi$ along with respective corresponding steering-wheel angles $\theta$ for various combinations of an operation mode and a steering-compensation type.

The controller 40 is arranged to transmit and receive signals in a known manner through a communications network 44, such as a controller area network (CAN) bus, Ethernet, Local Interconnect Network (LIN), and/or by any other wired or wireless communications network. The communications network 44 connects the controller 40, the sensors 42, the steering-wheel actuator 36, and the steering system 38.

Figure 4:
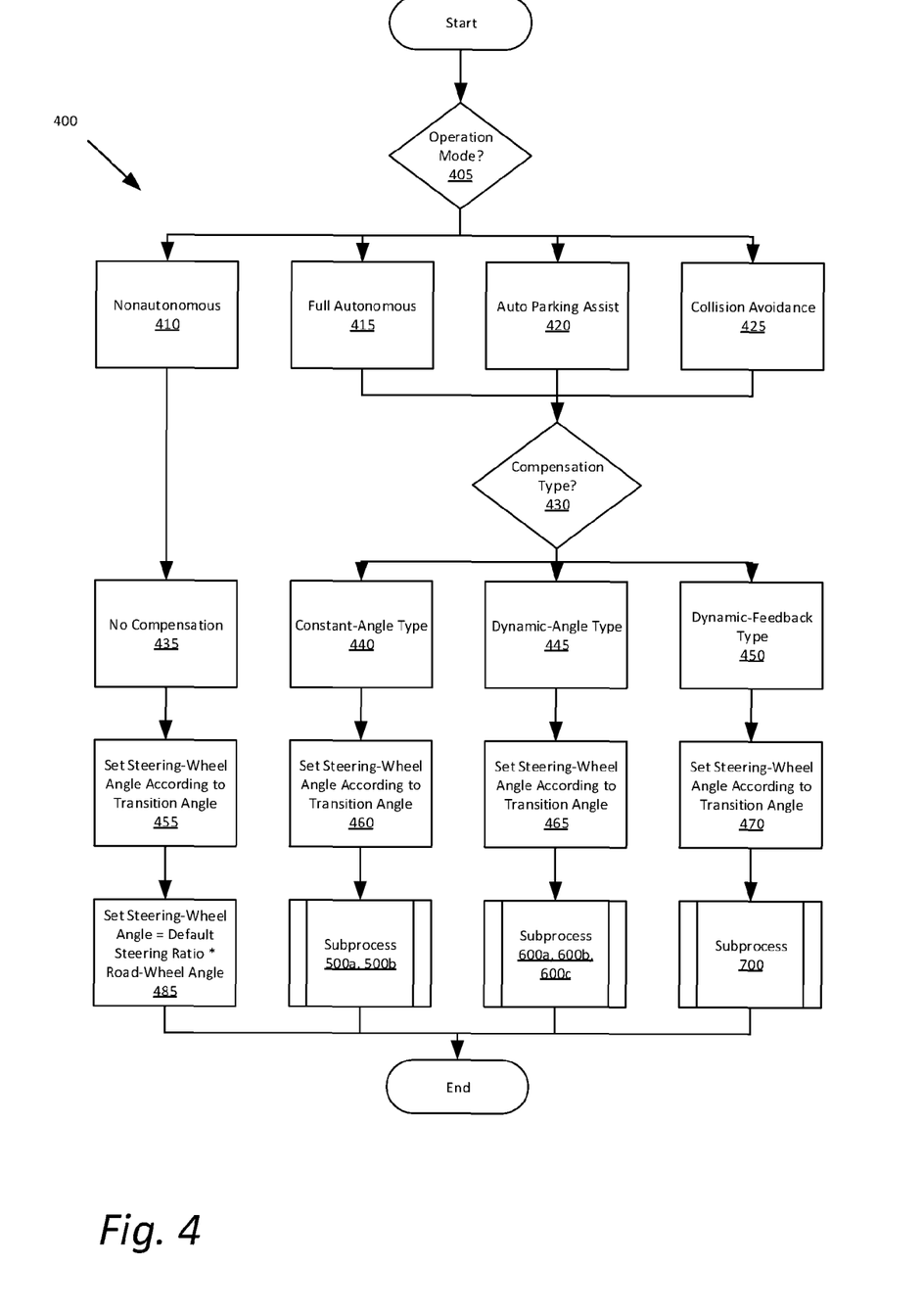
FIG. 4 is a process flow diagram of an exemplary process for controlling the steering wheel of FIG. 2.

FIG. 4 is a process flow diagram illustrating an exemplary process 400 for controlling the rotation of the steering wheel 32 of the vehicle 30, specifically for determining a steering-wheel angle $\theta$ based on a road-wheel angle $\phi$, an operation mode, and a steering-compensation type. The process 400 begins in a decision block 405 in which the controller 40 determines a current operation mode of the vehicle 30. As explained above, an operation mode specifies what entity or combination of entities, i.e., a human operator and/or the controller 40, controls various systems of the vehicle 30, including propulsion, steering, and brakes, and the conditions under which that operation mode occurs. The operation mode may be selected based on input from an occupant or implemented independently by the controller 40 based on, for example, vehicle conditions or external circumstances as determined from the sensors 42. Possible operation modes include a nonautonomous mode and at least one autonomous mode, such as fully autonomous operation, automated parking assistance, and collision avoidance. These possible operation modes are provided by way of example and not limitation; other autonomous or semi-autonomous operation modes are possible and could be included in the process 400. In the present example, the process 400 proceeds to a block 410 if a non-autonomous mode is identified, to a block 415 if a full autonomous mode is identified, to a block 420 if an auto parking assist mode is identified, and to a block 425 if a collision avoidance mode is identified.

In the block 410, the operation mode is a nonautonomous mode, e.g., such as is presently known. The nonautonomous operation mode has a default steering ratio. The steering ratio is the ratio between the angle that the steering wheel 32 rotates and the angle that the road wheel 34 turns. Depending on the characteristics of the steering system 38, the default steering ratio may be constant or variable, that is, the default steering ratio may vary based on an amount of rotation of the steering wheel 32, e.g., a steering ratio can be decreased as the steering-wheel angle $\theta$ increases.

Following the block 410, in a block 435, the steering-compensation type is no compensation. Once the steering-compensation type is set to no compensation, in a block 455, the steering-wheel angle $\theta$ is set to transition from the previous steering-compensation type, if any, to the appropriate angle for no compensation. The controller 40 sets the steering-wheel angle $\theta$ in a manner that changes in a continuous manner from the steering-wheel angle $\theta$ set according to the previous steering-compensation type to the steering-wheel angle $\theta$ according to no compensation. For example, the steering-wheel angle $\theta$ can be modified by imposing a superimposition angle. The controller 40 detects an offset angle between a requested motor angle and an actual motor angle and reduces the offset at a reduction rate selected as a function of at least one variable selected by a human driver. The variable can be or include, for example, a steering-wheel speed, a rack speed, an offset reduction speed, or a road-wheel speed. An algorithm for smoothly transitioning between steering-wheel angles θ for different steering-compensation types is known and is presented in more detail in U.S. Pat. No. 8,515,622, which is hereby incorporated herein by reference in its entirety, although other algorithms for transitioning between steering-wheel angles θ are possible.

Next, in a block 485, the steering-wheel angle θ is set to the default steering ratio multiplied by the road-wheel angle ϕ; therefore, the steering-wheel angle θ is a default steering-wheel angle θ. The default steering-wheel angle θ is dynamic because the default steering-wheel angle θ is a function of the road-wheel angle ϕ, which changes as the vehicle 30 travels. The controller 40 instructs the steering-wheel actuator 36 to rotate the steering wheel 32 according to the steering-wheel angle θ; alternatively, the steering-wheel actuator 36 connects the steering wheel 32 to the steering system 38 and transfers input from the steering wheel 32 in a known manner such that movement of the steering wheel 32 provides input to the steering system 38 to change the road wheel angle ϕ.

In the block 415, after the decision block 405, the operation mode is a full-autonomous mode, e.g., such as is presently known. The full-autonomous mode may be selected through input from a human occupant of the vehicle 30 or may be a default operation mode of the vehicle 30, that is, automatically selected in the absence of another selection. In the full-autonomous mode, the controller 40 controls the engine, steering, and brakes independently of a human operator.

In a block 420, after the decision block 405, the operation mode is an automated parking assist mode, e.g., such as is presently known. The automated parking assist mode may be selected through input from a human occupant or selected by the controller 40 if, for example, the vehicle 30 is in full-autonomous mode and a scenario occurs in which the vehicle 30 should be parked. In the automated parking assist mode, the controller 40 temporarily controls the engine, steering, and brakes independently of a human operator in order to execute a parking maneuver.

In a block 425, after the decision block 405, the operation mode is a collision-avoidance mode, e.g., such as is presently known. The collision avoidance mode may be selected by the controller 40 if the controller 40 senses a stimulus, for example, correlated with an elevated risk to the vehicle 30. For example, the vehicle 30 may cross a lane marking without signaling, or the vehicle 30 may drift toward a second vehicle located in the blind spot of the vehicle 30. In the crash-avoidance mode, the controller 40 warns the human operator or temporarily controls the engine, steering, and brakes independently of a human operator in order to execute a maneuver that lowers the risk to the vehicle 30 or to the surroundings, for example, steering the vehicle 30 back into a lane that the vehicle 30 had drifted out of.

Next, in a decision block 430, after one of the blocks 415, 420, or 425, the controller 40 determines the steering-compensation type. The steering-compensation type defines the relationship between the road-wheel angle ϕ, as dictated by the steering system 38, and the steering-wheel angle θ. Possible steering-compensation types include a constant-angle type, a dynamic-angle type, a dynamic-feedback type, and any other predefined type of relationship. In the present example, one of the blocks 440, 445, 450 follows the block 430 depending on an identified compensation type.

Figure 5A:
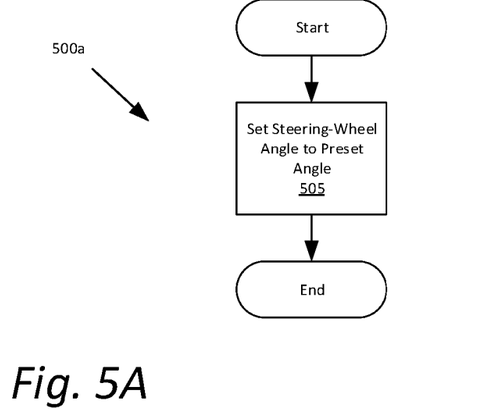
FIGS. 5A-B are process flow diagrams of exemplary subprocesses of the process of FIG. 4 for a constant-angle type of steering compensation.
Figure 5B:
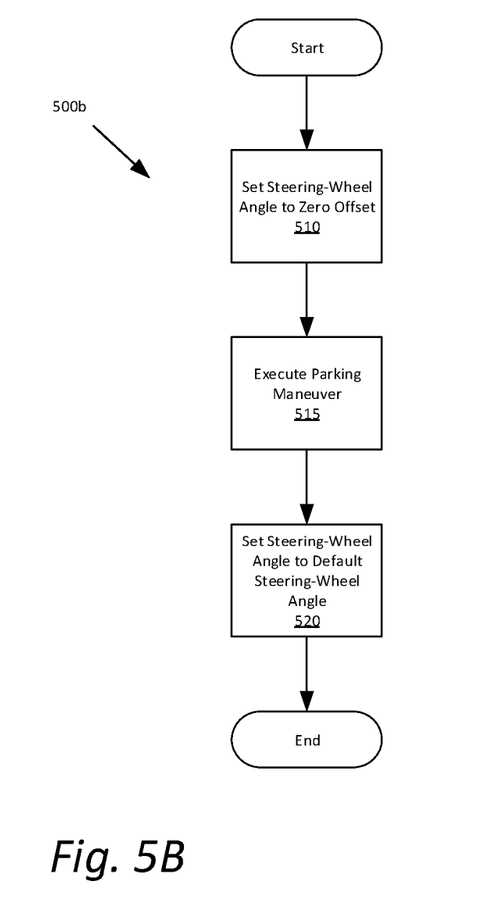

In the block 440 after the decision block 430, the steering-compensation type is a constant-angle type. The constant-angle type specifies a same steering-wheel angle θ for two or more different road-wheel angles ϕ in a plurality of stored road-wheel angles ϕ or for all of the plurality of stored road-wheel angles ϕ. For example, the steering wheel 32 remains stationary at, for example, a preset angle such as zero degrees as the vehicle 30 turns while driving. Then, in a block 460, the controller 40 transitions from the steering-wheel angle θ as set by the previous steering-compensation type, if any, to the steering-wheel angle θ according to the constant-angle type, as already described with respect to the block 455 above. The block 460 is followed by a subprocess 500a or 500b, described below. The controller 40 may be programmed for only one of subprocesses 500a and 500b, or the controller 40 may choose one of subprocesses 500a and 500b based on user preference and/or the operation mode, for example, subprocess 500a for full-autonomous mode and subprocess 500b for automated parking assist mode. The process 400 ends after the subprocess 500a or 500b.

In a block 445 after the decision block 430, the steering-compensation type is a dynamic-angle type. The dynamic-angle type specifies a steering-wheel angle θ based on the road-wheel angle ϕ for which the steering-wheel angle θ differs from the default steering-wheel angle θ that would be produced without steering compensation for two or more different road-wheel angles ϕ in a plurality of stored road-wheel angles ϕ, as described with respect to subprocesses 600a, 600b, and 600c. Then, in a block 465, the controller 40 transitions from the steering-wheel angle θ as set by the previous steering-compensation type, if any, to the steering-wheel angle θ according to the dynamic-angle type, as already described with respect to the block 455 above. The block 445 is followed by a subprocess 600a, 600b, or 600c, described below. The controller 40 may be programmed for only one of subprocesses 600a, 600b, and 600c, or the controller 40 may choose one of subprocesses 600a, 600b, and 600c based on user preference or the operation mode. For example, an occupant may select that subprocess 600c always occur for automated parking assist mode. The process 400 ends after the subprocess 600a, 600b, or 600c.

Figure 7:
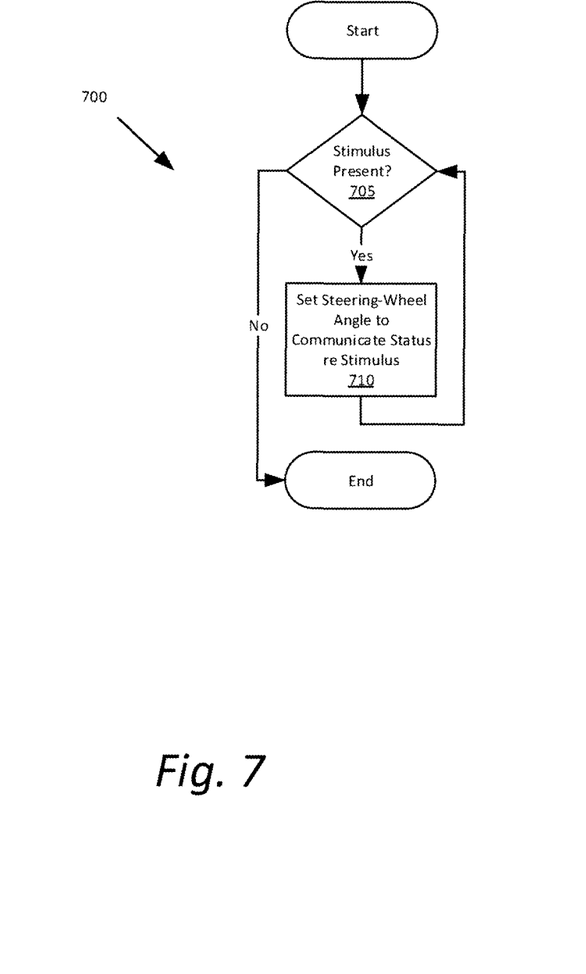
FIG. 7 is a process flow diagram of an exemplary subprocess of the process of FIG. 4 for a dynamic-feedback type of steering compensation.

In a block 450 after the decision block 430, the steering-compensation type is a dynamic-feedback type. The dynamic-feedback type specifies a steering-wheel angle θ that differs from the default steering-wheel angle θ based on the presence of a stimulus, as described below with respect to subprocess 700. Stimuli are characteristics of the environment that the controller 40 has been programmed to treat as representing an elevated risk to the vehicle 30 or the surroundings. Then, in a block 470, the controller 40 transitions from the steering-wheel angle θ as set by the previous steering-compensation type, if any, to the steering-wheel angle θ according to the dynamic-feedback type, as already described with respect to the block 455 above. The block 450 is followed by a subprocess 700, described below. The process 400 ends after the subprocess 700.

FIG. 5A is a process flow diagram of an exemplary subprocess 500a for controlling the rotation of the steering wheel 32 of the vehicle 30 in accordance with the constant-angle type of steering compensation. The controller 40 may choose the subprocess 500a based on user preference and/or the operation mode, for example, whenever full-autonomous mode has been selected. In a block 505 following the block 440, the controller 40 sets the steering-wheel angle θ to a preset angle. For example, the steering-wheel angle θ may be the same steering-wheel angle θ for two or more different road-wheel angles ϕ in a plurality of stored road-wheel angles ϕ. Alternatively, the steering-wheel angle θ may be the same for all of the plurality of stored road-wheel angles ϕ, so that the steering wheel 32 remains stationary regardless of steering system 38. The controller 40 instructs the steering-wheel actuator 36 to rotate the steering wheel 32 according to the steering-wheel angle θ, that is, to rotate to the preset angle. The preset angle may be set to zero, that is, a centered position for the steering wheel 32; may be chosen to improve accessibility to, for example, an ignition key; may be set to correspond to a previous state of the steering wheel 32, for example, when changing the operation mode; or may be tuned by, for example, an engineer during a development phase.

FIG. 5B is a process flow diagram of an exemplary subprocess 500*b* for controlling the rotation of the steering wheel 32 of the vehicle 30 in accordance with the constant-angle type of steering compensation. The controller 40 may choose the subprocess 500*b* based on user preference and/or the operation mode, for example, whenever automated parking assist mode has been selected. The subprocess 500*b* is used by the controller 40 if the operation mode is the automated parking assist mode. In a block 510 following the block 440, the controller 40 sets the steering-wheel angle θ to zero offset from the center position. The controller 40 instructs the steering-wheel actuator 36 to rotate the steering wheel 32 according to the steering-wheel angle θ.

Next, in a block 515, the controller 40 instructs the engine, steering, and brakes to execute a parking maneuver, for example, using known park-assist technology. During the parking maneuver, the steering wheel 32 remains at zero offset from the center position.

Next, in a block 520 upon completion of the parking maneuver, the controller 40 sets the steering-wheel angle θ to the default steering-wheel angle θ. The controller 40 instructs the steering-wheel actuator 36 to rotate the steering wheel 32 according to the steering-wheel angle θ.

Figure 6A:
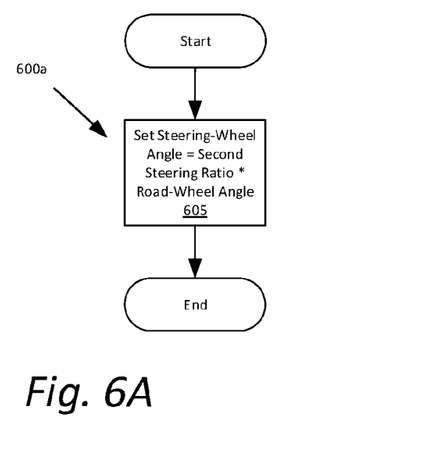
FIGS. 6A-C are process flow diagrams of exemplary subprocesses of the process of FIG. 4 for a dynamic-angle type of steering compensation.

FIG. 6A is a process flow diagram of an exemplary subprocess 600*a* for controlling the rotation of the steering wheel 32 of the vehicle 30 in accordance with the dynamic-angle type of steering compensation. The controller 40 may choose the subprocess 600*a* based on user preference or the operation mode. In a block 605 following the block 445, the controller 40 sets the steering-wheel angle θ equal to a second steering ratio multiplied by the road-wheel angle ϕ. The second steering ratio is less than the default steering ratio, for example, 7:1 rather than 15:1. The second steering ratio may be tuned by, for example, an engineer during a development phase. Factors by which the second steering ratio may be determined include reactions and behavior of occupants during simulated or actual test driving. The controller 40 instructs the steering-wheel actuator 36 to rotate the steering wheel 32 according to the steering-wheel angle θ. The rotation of the steering wheel 32 is less than the rotation of the steering wheel 32 would be without steering compensation.

Figure 6B:
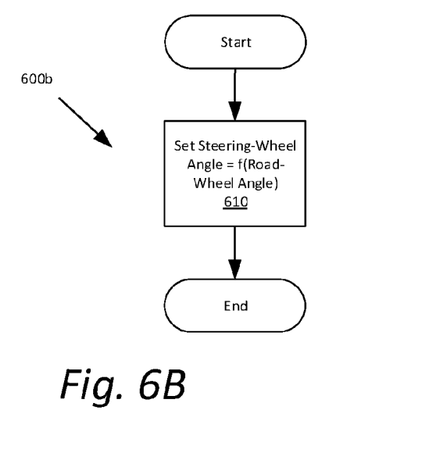

FIG. 6B is a process flow diagram of an exemplary subprocess 600*b* for controlling the rotation of the steering wheel 32 of the vehicle 30 in accordance with the dynamic-angle type of steering compensation. The controller 40 may choose the subprocess 600*b* based on user preference or the operation mode. In a block 610 following the block 445, the controller 40 sets the steering-wheel angle θ equal to a result of a nonlinear function of the road-wheel angle ϕ. The controller 40 instructs the steering-wheel actuator 36 to rotate the steering wheel 32 according to the steering-wheel angle θ. For example, the function may exaggerate steering-wheel angles θ to be greater than a default steering-wheel angle θ for small road-wheel angles ϕ but also shrink steering-wheel angles θ to be less than a default steering-wheel angle θ for large road-wheel angles ϕ, making small turns more easily noticed by an occupant observing the steering wheel 32 but large turns less dramatic. Alternatively, the nonlinear function could use a relatively lower steering ratio, for example, 7:1, for smaller steering-wheel angles, for example, between −10° and 10°, and a relatively larger steering ratio, for example, 14:1, for larger steering-wheel angles, for example, less than −10° and greater than 10°. This nonlinear function may be used, for example, for the full-autonomous mode when the vehicle 30 is maintaining a position within a lane.

Figure 6C:
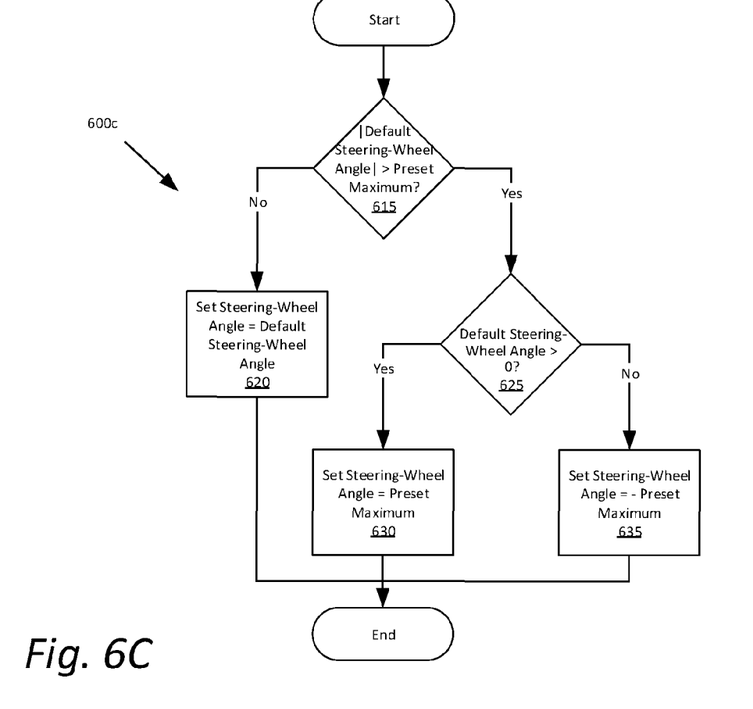

FIG. 6C is a process flow diagram of an exemplary subprocess 600*c* for controlling the rotation of the steering wheel 32 of the vehicle 30 in accordance with the dynamic-angle type of steering compensation. The controller 40 may choose the subprocess 600*c* based on user preference or the operation mode, for example, whenever the operation mode is automated parking assist mode. In a block 615 following the block 445, the controller 40 determines whether the absolute value of the default steering-wheel angle θ is greater or lesser than a preset maximum, for example, 30°. The preset maximum may be chosen to allow occupants to clearly see turns of the steering wheel 32 while limiting the turns from being overly drastic.

Next, if the absolute value of the default steering-wheel angle θ is less than the preset maximum, in a block 620, the controller 40 sets the steering-wheel angle θ equal to the default steering-wheel angle θ.

If the absolute value of the default steering-wheel angle θ is greater than the preset maximum, in a block 625, the controller 40 determines whether the default steering-wheel angle θ is positive or negative, which corresponds to the road-wheel angle ϕ turning to the right or to the left.

Next, if the default steering-wheel angle θ is positive, in a block 630, the controller 40 sets the steering-wheel angle θ to the preset maximum. If the default steering-wheel angle θ is negative, in a block 635, the controller 40 sets the steering-wheel angle θ to the negative value of the preset maximum. In either case, the controller 40 instructs the steering-wheel actuator 36 to rotate the steering wheel 32 according to the steering-wheel angle θ. In effect, the steering wheel 32 rotates according to the default steering-wheel angle θ up to the preset maximum in either direction, so for many turns of the vehicle 30, the steering wheel 32 indicates to an occupant a direction but not a magnitude of the turn.

FIG. 7 is a process flow diagram of an exemplary subprocess 700 for controlling the rotation of the steering wheel 32 of the vehicle 30 in accordance with the dynamic-feedback type of steering compensation. In a decision block 705 following the block 450, the controller 40 determines whether a stimulus is present. If no stimulus is present, then the controller 40 takes no action, and the subprocess 700 ends.

Next, if a stimulus is present, in a block 710, the controller 40 sets the steering-wheel angle θ to communicate a state of the vehicle 30 related to the stimulus to a driver. For example, if the stimulus is that the vehicle 30 is skidding, the controller 40 may rotate the steering wheel 32 toward the direction that the vehicle 30 is skidding. The rotation of the steering wheel 32 increases the likelihood that the driver countersteers, that is, turns the steering wheel 32 in the opposite direction as the skid. For another example, if the stimulus is an obstacle ahead of the vehicle 30, the controller 40 may rotate the steering wheel 32 toward an open lane to indicate to the driver the presence of the obstacle and possibility of a lane change to avoid the obstacle. Then the subprocess 700 continues back to the decision block 705. In effect, as long as the stimulus is present, the steering wheel 32 continues to communicate the state of the vehicle relative to the stimulus to the driver.

Computing devices such as the controller 40 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. The claims should be given their plain and ordinary meaning as understood by those skilled in the art. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A controller comprising a processor and a memory in a vehicle including a steering wheel, a steering-wheel actuator coupled to the steering wheel, and a road wheel, the controller programmed to:
   determine a steering-wheel angle based on a road-wheel angle of the road wheel from a sensor of the vehicle, an operation mode of the vehicle stored in the memory, and a steering-compensation type of the vehicle stored in the memory, wherein the operation mode includes a nonautonomous mode having a default steering ratio and at least one autonomous mode;
   instruct the steering-wheel actuator to rotate the steering wheel according to the steering-wheel angle,
   determine that the operation mode is the nonautonomous mode; and
   upon determining that the operation mode is the nonautonomous mode, instruct the steering-wheel actuator to rotate the steering wheel to a default steering-wheel angle that is the default steering ratio multiplied by the road-wheel angle.

2. The controller of claim 1, wherein the steering-compensation type includes a constant-angle type that specifies a same steering-wheel angle for two or more different road-wheel angles in a plurality of stored road-wheel angles.

3. The controller of claim 2, wherein the steering-wheel angle is the same for all of the plurality of stored road-wheel angles.

4. The controller of claim 2, wherein the operation mode includes an automated parking assist mode.

5. The controller of claim 4, wherein the controller is further programmed to determine that the steering-compensation type is the constant-angle type and the operation mode is the automated parking assist mode; upon determining that the steering-compensation type is the constant-angle type and the operation mode is the automated parking assist mode, instruct the steering-wheel actuator to set the steering-wheel angle to zero offset from a center position; instruct the vehicle to execute a parking maneuver; and, upon completion of the parking maneuver, instruct the steering-wheel actuator to set the steering-wheel angle to the default steering-wheel angle.

6. The controller of claim 1, wherein the steering-compensation type includes a dynamic-angle type that specifies a steering-wheel angle based on the road-wheel angle, the steering-wheel angle differing from the default steering-wheel angle for two or more different road-wheel angles in a plurality of stored road-wheel angles.

7. The controller of claim 6, wherein the controller is further programmed to determine that the steering-compensation type is the dynamic-angle type; and upon determining that the steering-compensation type is the dynamic-angle type, set the steering-wheel angle to a second steering ratio multiplied by the road-wheel angle, the second steering ratio being less than the default steering ratio.

8. The controller of claim 6, wherein the controller is further programmed to determine that the steering-compensation type is the dynamic-angle type; and upon determining that the steering-compensation type is the dynamic-angle type, set the steering-wheel so that an absolute value of the steering-wheel angle is the minimum of the default steering-wheel angle and a preset maximum.

9. The controller of claim 1, wherein the steering-compensation type includes a dynamic-feedback type that specifies a steering-wheel angle that differs from the default steering ratio based on the presence of a stimulus.

10. A method of steering a vehicle comprising:
determining, by a controller of the vehicle, a steering-wheel angle based on a road-wheel angle of a road wheel of the vehicle from a sensor of the vehicle, an operation mode of the vehicle stored by the controller, and a steering-compensation type of the vehicle stored by the controller, wherein the operation mode includes a nonautonomous mode having a default steering ratio and at least one autonomous mode;
instructing, by the controller, a steering-wheel actuator coupled to a steering wheel of the vehicle to rotate the steering wheel according to the steering-wheel angle,
determining, by the controller, that the operation mode is the nonautonomous mode, and
upon determining that the operation mode is the nonautonomous mode, instructing, by the controller, the steering-wheel actuator to rotate the steering wheel to a default steering-wheel angle that is the default steering ratio multiplied by the road-wheel angle.

11. The method of claim 10, wherein the steering-compensation type includes a constant-angle type that specifies a same steering-wheel angle for two or more road-wheel angles in a plurality of stored road-wheel angles.

12. The method of claim 11, wherein the steering-wheel angle is the same for all of the plurality of stored road-wheel angles.

13. The method of claim 11, wherein the operation mode includes an automated parking assist mode.

14. The method of claim 13, further comprising determining, by the controller, that the steering-compensation type is the constant-angle type and the operation mode is the automated parking assist mode,
upon determining that the steering-compensation type is the constant-angle type and the operation mode is the automated parking assist mode, setting, by the controller, the steering-wheel angle to zero offset from a center position;
executing, by the controller, the parking maneuver; and,
upon completion of the parking maneuver, setting, by the controller, the steering-wheel angle to the default steering-wheel angle.

15. The method of claim 10, wherein the steering-compensation type includes a dynamic-angle type that specifies a steering-wheel angle based on the road-wheel angle, the steering-wheel angle differing from the default steering-wheel angle for two or more road-wheel angles in a plurality of stored road-wheel angles.

16. The method of claim 15, further comprising determining, by the controller, that the steering-compensation type is the dynamic-angle type; and upon determining that the steering-compensation type is the dynamic-angle type, setting, by the controller, the steering-wheel angle to a second steering ratio multiplied by the road-wheel angle, the second steering ratio being less than the default steering ratio.

17. The method of claim 15, further comprising determining, by the controller, that the steering-compensation type is the dynamic-angle type; and upon determining that the steering-compensation type is the dynamic-angle type, setting, by the controller, the steering-wheel so that an absolute value of the steering-wheel angle is the minimum of the default steering-wheel angle and a preset maximum.

18. The method of claim 10, wherein the steering-compensation type includes a dynamic-feedback type that specifies a steering-wheel angle that differs from the default steering-wheel angle based on the presence of a stimulus.

* * * * *